Aug. 23, 1966 J. J. EACHUS 3,268,819

ELECTRICAL APPARATUS FOR THE SHIFTING OF DIGITAL DATA

Filed May 22, 1962 2 Sheets-Sheet 1

INVENTOR.
JOSEPH J. EACHUS
BY Henry L. Hanson
ATTORNEY

INVENTOR.
JOSEPH J. EACHUS
BY Henry L. Hanson
ATTORNEY

United States Patent Office 3,268,819

Patented August 23, 1966

3,268,819

ELECTRICAL APPARATUS FOR THE SHIFTING OF DIGITAL DATA

Joseph J. Eachus, Cambridge, Mass., assignor to Honeywell Inc., a corporation of Delaware Filed May 22, 1962, Ser. No. 196,722
9 Claims. (Cl. 328—37)

A general object of the present invention is to provide a new and useful electrical apparatus which may be used for storing and transferring digital data in a data manipulating circuit. More specifically, the present invention is concerned with a new and improved type of electronic shift register circuit which is characterized by the simplified logic circuitry utilized for implementing the shifting of digital data and which logic is readily adapted for use in unidirectional or bidirectional types of shift registers.

Electronic data processing or data manipulating circuitry frequently has associated therewith circuitry for transferring digital data from one storage location to another. The apparatus for effecting such transfers is frequently referred to as a shift register. The digital data being transferred is most generally manifested by way of an electrical pulse, or a predetermined combination of signal levels, which may uniquely define binary "ones" and "zeros."

Saturable magnetic cores of the rectangular hysteresis type have been widely used for purposes of storing digital data and for use in other types of circuitry, such as shift register circuitry, wherein digital data manifestations may be shifted from one magnetic core to another through appropriate coupling circuitry. While shift registers implemented using magnetic cores as a storage element are very satisfactory for many purposes, data once stored in one of the magnetic core elements can be read out by way of a dynamic shifting condition within the core, or by way of extensive non-destructive interrogating circuitry which is especially coupled to the core. For this reason, it has been found desirable in many types of shift register applications to incorporate bistable electronic circuitry such as bistable flip-flops which when once set or reset, can be readily interrogated as to the electrical stable state of the bistable circuit without upsetting the static condition thereof. The incorporation of electronic bistable circuits of the flip-flop type into a shift register has heretofore involved relatively complex coupling circuitry which, because of the extensiveness of such circuitry, increases the possibility of circuit failure as well as increases the over-all cost of implementing the circuitry.

In accordance with the teachings of the present invention a series of bistable circuits are uniquely associated with saturable magnetic core elements wherein the logic between the bistable circuits is implemented using the magnetic core elements so arranged as to take optimum advantage of the ability of a magnetic core to function as a signal gating element and further to enhance the reliability of the circuit and to minimize the logic involved in implementing the circuit.

It is therefore a further more specific object of the present invention to provide a new and improved electronic shift register incorporating bistable circuits uniquely coupled to magnetic core elements which function as logical elements between the respective bistable circuits making up the storage elements of the shift register circuitry.

In a preferred embodiment of the present invention, the shift register takes the form of a series of separate bistable circuits each of which has a separate input which, when activated, is capable of complementing or reversing the bistable state of the associated bistable circuit. The complementing input is coupled to a sense winding associated with one or more logical elements. These logical elements comprise magnetic cores of the saturable type and these cores are adapted to be selectively saturated by outputs from the bistable circuits in such a manner as to distinctly define the bistable state of each one of the bistable circuits in the shift register. By applying a switching signal to all of the magnetic cores associated with the bistable circuitry, any core that is not saturated will switch and will reverse the bistable state of any bistable circuit which is coupled thereto by one of the sense windings.

It is therefore still another object of the present invention to provide a new and improved shift register circuit incorporating bistable circuits, each of which has an input for complementing or reversing the bistable state thereof with such input being adapted to be activated by a signal from a saturable magnetic core logical circuit which is adapted to be selectively saturated in accordance with the bistable state of the circuit as well as the bistable state of a further bistable circuit which precedes such circuit in the order of progression in the shift register circuit.

Another more specific object of the present invention is to provide a new and improved shift register circuit incorporating the objects set forth hereinabove in combination with further means for effecting a bidirectional shift within the associated shift register circuitry.

The foregoing objects and features of novelty which characterize the invention, as well as other objects of the invention, are pointed out with particularity in the claims annexed to and forming a part of the present specification. For a better understanding of the invention, its advantages and specific objects attained with its use, reference should be had to the accompanying drawings and descriptive matter in which there is illustrated and described a preferred embodiment of the invention.

Figure 1:
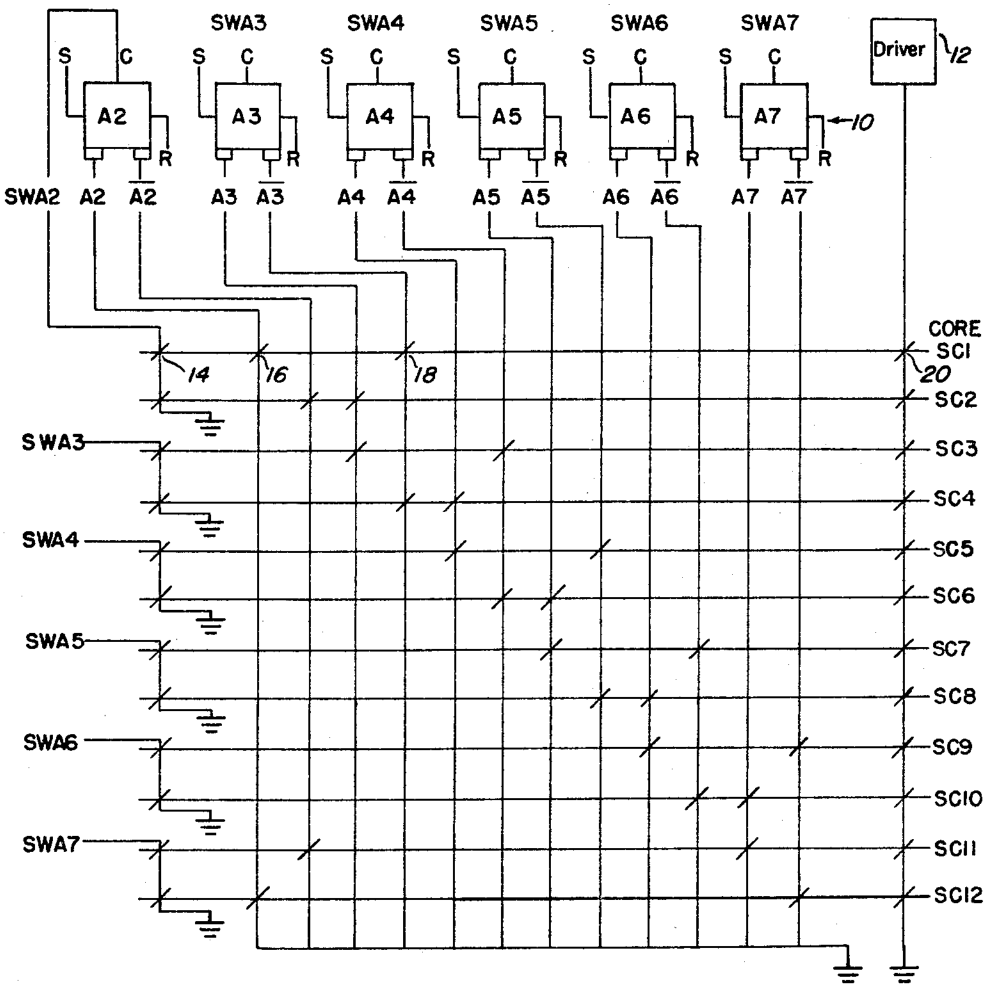
FIGURE 1 is a diagrammatic representation of a preferred form of shift register incorporating the principles of the present invention.

Referring first to FIGURE 1, there is here illustrated a unidirectional type of shift register incorporating the principles of the present invention. In this figure, the numeral 10 identifies a series of bistable circuits A2–A7 which represent the storage elements for storing the digital data shifted in the shift register circuit. Associated with these bistable circuits 10 are a series of saturable cores SC1–SC12 and these cores are each arranged with suitable sense windings SW coupled to the inputs of the bistable circuits 10. Saturating windings are also coupled to selective ones of the saturable cores for purposes of establishing the logic to be performed in the shift register operation. A driver winding is coupled to each of the saturable cores and this latter winding is connected to a suitable driver signal source 12 which is adapted to provide a signal suitable for switching any saturable core that is not saturated at the time that the drive signal is applied. In the particular embodiment illustrated in FIGURE 1, the shifting accomplished within the over-all circuit is what may be termed a downward shift wherein a signal inserted into the register circuit A7 will, in the course of the shifting operation, be shifted through the circuits A6, A5, etc., as each drive signal is applied to the cores.

Referring more specifically to FIGURE 1, each of the bistable circuits A2–A7 making up the register 10 may well be of the type of bistable circuit having a set input S, a reset input R and a complementing input C. It will thus be seen that each of these bistable circuits has facilities for establishing a predetermined bistable state within the circuit at the time that data is to be loaded into the register. Once the data has been loaded into the register, the application of a signal to any one of the complementing inputs C will serve to reverse the bistable state of the associated circuit. Each of the bistable circuits is assumed to have both an assertion output A and a negation output $\overline{A}$. A representative form of bistable circuit suitable for use in the present invention will be found in a copending application of the present inventor bearing Serial Number 656,791, filed May 3, 1957, now Patent Number 3,067,336.

Each of thes saturable cores SC has a sense winding associated therewith SW, at least two saturating windings A and $\overline{A}$, and a driver winding which is coupled to the driver 12. Thus, for example, the core SC1 has a sense winding coupled thereto at 14, the coupling being illustrated in the drawing by way of a diagonal line intersecting the core and the sense winding SW. A pair of saturating or inhibit windings A2 and $\overline{A3}$ are also coupled to the saturable core SC1 at 16 and 18 respectively. Further, the driver winding is coupled to the core SC1 at 20. Similar winding couplings have been made on each of the other saturable cores.

Figure 2:
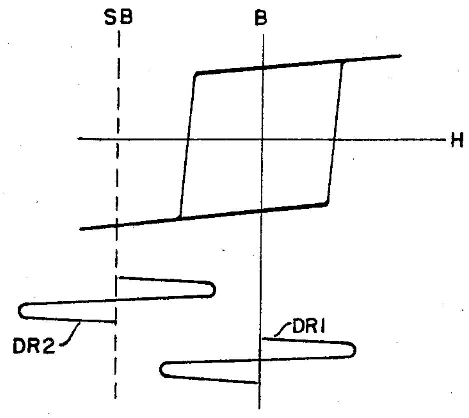
FIGURE 2 illustrates waveforms associated with the operating characteristics of the magnetic cores used in the logical circuitry of the present invention.

Before considering the over-all operation of the circuitry of FIGURE 1, reference is made to FIGURE 2. In this figure, the hysteresis characteristic of a preferred type of saturable core, such as used in FIGURE 1, is shown. The hysteresis characteristic may well be of the type referred to as a rectangular hysteresis characteristic with fairly pronounced saturated states. Normally, the hysteresis characteristic will be centered on the B–H coordinates, as shown. Further, in the absence of some external biasing source, the application of a drive signal DR1 will cause the core to be switched from one saturated state into the other and back as the drive signal is applied. When the core is switched in this manner, a signal may be coupled from the core by way of a sense winding wound thereon or coupled thereto.

In the vent that there is a direct current saturating bias SB applied to the core, the operating point for any drive signal, such as the drive signal DR2, will have been shifted sufficiently that the drive signal will not be capable of causing any substantial change in flux in the associated core. Consequently, substantially no signal will be coupled into any sense winding on the core. Thus, since each of the saturable core devices SC in FIGURE 1 will preferably take the form described here in connection with FIGURE 2, it will be apparent that it is possible to selectively control the coupling of a signal through any particular core in accordance with whether or not the core is saturated.

Considering next the over-all operation of the circuitry of FIGURE 1, it is first assumed that each of the bistable circuits A2 through A7 is in a reset state. As long as all of the bistable circuits remain in this reset state, all of the saturable cores SC will be saturated by signals derived from the negation outputs of the respective bistable circuits. Thus, the negation output of the bistable circuit A2 will be saturating saturable cores SC2 and SC11. Similarly, the negation output $\overline{A3}$ of the bistable circuit A3 will be saturating saturable cores SC1 and SC4. Further, the outputs of each of the other bistable circuits will be saturating the other remaining saturable cores SC. As long as these cores are saturated, the application of the drive signal from the driver 12 will not be effective to cause any switching in any of the saturable cores and consequently no signals will be coupled into the sense windings SW. Thus, the reset state existent in all of the register stages A2 through A7 will remain in the reset stages.

It is assumed next that an external signal is applied to the bistable register circuit A7 so that this circuit will be switched from the reset state to the set state. When this occurs the negation output $\overline{A7}$ will become inactive and the assertion output A7 will become active. Thus, the saturating current will be removed from the saturable core SC12 and the core SC9. As soon as the next drive signal is applied by the driver 12 to the drive lines on each of the saturable cores, the saturable cores SC9 and SC12 will be free to switch. Upon switching, a signal will be coupled into the sense windings SWA6 and SWA7. Since these sense windings are coupled to the bistable circuits A6 and A7 respectively by way of their respective complementing inputs C, the bistable state of each of the register circuits A6 and A7 will be reversed. Thus, the register circuit A6 will now be set and the register circuit A7 will be reset. It will thus be apparent that the digital input initially established in the bistable register circuit A7 has now been shifted to the register circuit A6.

Upon the application of the next drive signal from the driver 12, the saturable cores SC7 and SC10, which are now unsaturated, will switch to produce output signals on the associated sense windings. These signals will cause the digital condition, or bistable state, of the register circuit A6 to be shifted to the register circuit A5. A further examination of the circuitry illustrated in FIGURE 1 will indicate that the continued application of drive signals will cause the bistable state to be shifted through the register 10 until the register circuit A2 has been set. The application of a further drive signal will then shift the bistable state from circuit A2 into the bistable circuit A7 inasmuch as the logic of the shift register illustrated has been arranged to form a closed loop register.

In general terms, it may be stated that the magnetic logic associated with the circuitry of FIGURE 1 has been arranged so that the switching of a particular bistable circuit in the register 10 from one bistable state to the other will be accomplished if, and only if, the bistable state of the register circuit preceding in the order of progression is in a different bistable state. More specifically, the logic for implementing this form of shift register may be as represented by the Boolean statements in the following Table I:

*Table I*

$$DA2=A2\overline{A3}+\overline{A2}A3$$
$$DA3=A3\overline{A4}+\overline{A3}A4$$
$$DA4=A4\overline{A5}+\overline{A4}A5$$
$$DA5=A5\overline{A6}+\overline{A5}A6$$
$$DA6=A6\overline{A7}+\overline{A6}A7$$
$$DA7=A7\overline{A2}+\overline{A7}A2$$

High Order to Low Order

By definition in the foregoing Table I, each of the bistable circuits is represented on the left hand of the equation by the term DA and the creation of this particular function by an equality condition existing in either one or the other of the two opposite terms of the Boolean equation will cause a reversal condition to be created in the associated bistable circuit represented in the left-hand portion of the equation. Thus, the register A2 will be reversed in its bistable state if the signals A2 and $\overline{A3}$ are both in a "permit" state or the signal $\overline{A2}$ and A3 are both in a permit state. Stated in another way, the register A2 will be changed in its bistable state when the register A3 is in a state different than the state of the register A2. It will be apparent from the circuitry of FIGURE 1 that each term of the Boolean equation is represented by a separate core and the conditioning of the saturating windings associated with one or the other of these cores, in order to effect a switching of the core, requires that the signals thereon be in a "permit" state so that the drive signal will be able to switch the associated cores.

It will further be observed from the Boolean equations expressed in the above Table I that the implementation requires the use of a total of two magnetic cores for each bistable circuit, thus making a total of twelve cores required for a six-bit register circuit. The extensions of this logic to an additional number of registers will be readily apparent.

In order to reverse the direction of the shifting within the register circuit illustrated in FIGURE 1, it is necessary to modify the logic that is set forth in the magnetic cores coupled to the bistable circuits. Table II defines the logic necessary in order to implement the shifting operation in the opposite direction.

*Table II*

$$\mathrm{DA2}=\mathrm{A2}\overline{\mathrm{A7}}+\overline{\mathrm{A2}}\mathrm{A7}$$
$$\mathrm{DA3}=\mathrm{A3}\overline{\mathrm{A2}}+\mathrm{A2}\overline{\mathrm{A3}}$$
$$\mathrm{DA4}=\mathrm{A4}\overline{\mathrm{A3}}+\overline{\mathrm{A4}}\mathrm{A3}$$
$$\mathrm{DA5}=\mathrm{A5}\overline{\mathrm{A4}}+\overline{\mathrm{A5}}\mathrm{A4}$$
$$\mathrm{DA6}=\mathrm{A6}\overline{\mathrm{A5}}+\overline{\mathrm{A6}}\mathrm{A5}$$
$$\mathrm{DA7}=\mathrm{A7}\overline{\mathrm{A6}}+\overline{\mathrm{A7}}\mathrm{A6}$$

Low Order to High Order

Figure 3:
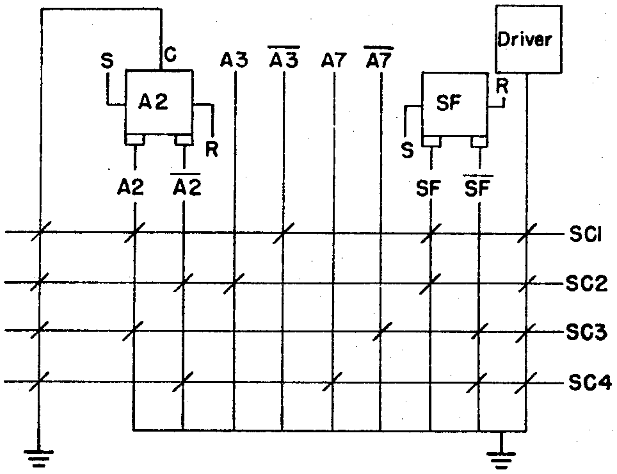
FIGURE 3 is a diagrammatic representation of a portion of the invention adapted for bidirectional shifting in the shift register circuitry.

The apparatus of FIGURE 3 shows a representative portion of a shift register circuit which may be useful in shifting information bidirectionally in the register circuit. As illustrated in FIGURE 3, the bistable circuit under consideration in the register circuit is the register circuit A2. The assertion output lines A3 and A7 as well as the negation lines $\overline{A3}$ and $\overline{A7}$ are also illustrated. Also shown in FIGURE 3 is a directional control bistable circuit SF which has both an assertion output SF (Shift Forward) and negation outputs $\overline{SF}$ (Shift Reverse). A total of four saturable magnetic core circuits SC1 through SC4 have been illustrated for purposes of implementing the logic required to shift a signal represented by the bistable outputs of the bistable circuits A3 or A7 in accordance with whether the directional control circuit SF is in the set or reset state. It will be noted in this figure that the sense winding associated with the complementing input C of the bistable circuit A2 is coupled to all four cores making up the logic for effecting the transfer between the bistable circuits of the register.

In FIGURE 3, when the bidirectional control flip-flop SF is in the set state, the saturable cores SC1 and SC2 will both be saturated so that any shifting operation to take place will be dependent upon the saturated state of the saturable cores SC3 and SC4. Thus, the bistable state of the register circuit A7 will be shifted into the circuit A2 if the bistable states are different.

By reversing the bistable state of the directional control flip-flop SF so that the circuit is reset, it will cause the saturable cores SC3 and SC4 to be saturated. Consequently, the saturated state of the saturable cores SC1 and SC2 will determine whether or not a signal may be coupled from the bistable condition of the register circuit A3 to the register circuit A2.

The implementation of a bidirectional register circuit of six stages, such as illustrated in FIGURE 1, may be carried out by constructing a circuit in accordance with the Boolean equations set forth in the following Table III:

*Table III*

$$\mathrm{DA2}=\mathrm{A2}\overline{\mathrm{A3}}\mathrm{SF}+\overline{\mathrm{A2}}\mathrm{A3SF}+\mathrm{A2}\overline{\mathrm{A7SF}}+\overline{\mathrm{A2}}\mathrm{A7}\overline{\mathrm{SF}}$$
$$\mathrm{DA3}=\mathrm{A3}\overline{\mathrm{A4}}\mathrm{SF}+\overline{\mathrm{A3}}\mathrm{A4SF}+\mathrm{A3}\overline{\mathrm{A2SF}}+\mathrm{A2}\overline{\mathrm{A3SF}}$$
$$\mathrm{DA4}=\mathrm{A4}\overline{\mathrm{A5}}\mathrm{SF}+\overline{\mathrm{A4}}\mathrm{A5SF}+\mathrm{A4}\overline{\mathrm{A3SF}}+\overline{\mathrm{A4}}\mathrm{A3}\overline{\mathrm{SF}}$$
$$\mathrm{DA5}=\mathrm{A5}\overline{\mathrm{A6}}\mathrm{SF}+\overline{\mathrm{A5}}\mathrm{A6SF}+\mathrm{A5}\overline{\mathrm{A4SF}}+\overline{\mathrm{A5}}\mathrm{A4}\overline{\mathrm{SF}}$$
$$\mathrm{DA6}=\mathrm{A6}\overline{\mathrm{A7}}\mathrm{SF}+\overline{\mathrm{A6}}\mathrm{A7SF}+\mathrm{A6}\overline{\mathrm{A5SF}}+\overline{\mathrm{A6}}\mathrm{A5}\overline{\mathrm{SF}}$$
$$\mathrm{DA7}=\mathrm{A7}\overline{\mathrm{A2}}\mathrm{SF}+\overline{\mathrm{A7}}\mathrm{A2SF}+\mathrm{A7}\overline{\mathrm{A6SF}}+\overline{\mathrm{A7}}\mathrm{A6}\overline{\mathrm{SF}}$$

It will be apparent from an examination of the Boolean statements in Table III that the implementation of the logic with respect to each of the bistable circuits of the register may be carried out by a total of four saturable cores in the manner illustrated for one of the register circuits in FIGURE 3. Whether or not the total register circuits will operate in a forward or reverse direction will be dependent upon whether or not the directional control circuit SF is in a set or reset state.

It will be apparent from considering the foregoing described apparatus that there has been provided a new and improved shift register circuit which takes optimum advantage of the use of magnetic cores for carrying out logical functions with the operation being capable of performance in either a forward or reverse direction in separate circuits, or in a combined shift register circuit, by imposing an additional control function in the logic of the circuit.

While, in accordance with the provisions of the statutes, there has been illustrated and described the best forms of the invention known, it will be apparent to those skilled in the art that changes may be made in the apparatus described without departing from the spirit of the invention as set forth in the appended claims and that, in some cases, certain features of the invention may be used to advantage without a corresponding use of other features.

Having now described the invention, what is claimed as new and novel and for which it is desired to secure by Letters Patent is:

1. A digital data shift register ccomprising a plurality of bistable circuits each of said bistable circuits having an input connected thereto which input when activated is effective in reversing the bistable state thereof and each of the inputs to said bistable circuits being further adapted to be activated in accordance with the bistable state of its associated bistable circuit, each of said bistable circuits having at least two outputs, a plurality of saturable magnetic core elements, a separate sense winding means coupled to each input of each bistable circuit and to two magnetic core elements, means coupling one output of each of said bistable circuits to one of said two magnetic core elements associated therewith, means coupling the other output of each of said bistable circuits to the other of said two magnetic core elements associated therewith, means coupling an output of the next adjacent bistable circuit to one of said two magnetic core elements, means coupling the other output of said next adjacent bistable circuit to the other of said two magnetic core elements, each of said outputs when active being adapted to saturate any core element coupled thereto, and drive means coupled to all of said core elements to switch any core element which is not saturated.

2. A shift register comprising a first bistable circuit AX having a complementing input, an assertion output AX and a negation output $\overline{AX}$, a second bistable circuit AY having an assertion output AY and a negation output $\overline{AY}$, a first saturable magnetic core, means coupling said AX and $\overline{AY}$ outputs to said first magnetic core, a second saturable magnetic core, means coupling said $\overline{AX}$ and AY outputs to said second magnetic core, a sense means coupled to said first and second magnetic cores and to said complementing input, and core driving means coupled to said cores to switch any core that is not saturated by said outputs.

3. A pair of bistable circuits, each of which has an assertion and negation output and a complementing input, a pair of magnetic cores, means connecting the assertion output of one of said bistable circuits and the negation output of the other of said bistable circuits to one of said magnetic cores and the assertion output of said other bistable circuit and the negation output of said one bistable circuit to the other of said magnetic cores, means coupled to siad magnetic cores to switch any magnetic core that is not saturated, and means sensing the switching of either of said cores, said last named means being operatively connected to said complementing input of one of said bistable circuits to change the bistable state of said one of said bistable circuits.

4. A bidirectional shift register comprising a first pair of bistable circuits each having a self-complementing input and a pair of outputs, a first pair of saturable magnetic cores having a complementary output from each of said bistable circuits coupled to each core of said first pair of saturable magnetic cores, a second pair of saturable magnetic cores having a complementary output from each one of a second pair of bistable circuits coupled to each core of said second pair of saturable magnetic cores, one of said second pair of bistable circuits being common to said first pair of bistable circuits, and means sensing the switching of any of said saturable magnetic cores connected to said complementing input of said common one of said bistable circuits, a core switching means coupled to all of said cores and being adapted to switch any core that is not saturated, and directional control means coupled to said first and second pair of magnetic cores to saturate selectively either one or the other of said pair of magnetic cores to control the direction of signal transfer between said first and second pairs of bistable circuits.

5. A shift register comprising a first bistable circuit AX having a complementing input, an assertion output AX and a negation output $\overline{AX}$, a second bistable circuit AY having an assertion output AY and a negation output $\overline{AY}$, a third bistable circuit AZ having an assertion output AZ and a negation output $\overline{AZ}$, first and second saturable magnetic cores, means coupling said AX and $\overline{AY}$ outputs to said first magnetic core, means coupling said $\overline{AX}$ and AY outputs to said second magnetic core, third and fourth saturable magnetic cores, means coupling said AX and $\overline{AZ}$ outputs to said third magnetic core, means coupling said $\overline{AX}$ and AZ outputs to said fourth magnetic core, a sense winding means coupled to said first, second, third and fourth magnetic cores and to said complementing input, directional control means coupled to said first, second, third and fourth magnetic cores to selectively saturate either said first and second or said third and fourth magnetic cores and core driving means coupled to said cores to switch any core that is not saturated by said outputs.

6. In a magnetic switching device, the combination comprising a plurality of self-complementing bistable circuits each having a complementing input and assertion and negation outputs, a plurality of saturable magnetic cores, means provided to effect the connection of said assertion and negation outputs of a bistable circuit to different ones of said saturable magnetic cores, said connecting means being further provided to effect the connection of the assertion output of each one of said bistable circuits and the negation output of an immediately adjacent bistable circuit to a common one of said saturable magnetic cores, means associated with each of said bistable circuits to initially energize either its assertion or negation output, a sense winding coupled to each pair of said saturable magnetic cores, each of said sense windings further connected as a complementing input to respective ones of said plurality of bistable circuits, and a source of drive signals coupled to all said saturable magnetic cores whereby the output signal from said source of drive signals is effective in switching any of said saturable magnetic cores on which neither an associated assertion or negation output is energized.

7. A bidirectional shift register comprising a plurality of bistable circuits each having an assertion and a negation output and a complementing input, a plurality of saturable magnetic cores, means connecting said assertion output and said negation output of each bistable circuit to two separate magnetic cores, said last-named means further connecting the assertion output of one of said bistable circuits and the negation output of a first immediately adjacent bistable circuit to a first one of said saturable magnetic cores and connecting the assertion output of said one bistable circuit and the negation output of a second immediately adjacent bistable circuit to a second one of said saturable magnetic cores, said last-named means further connecting the negation output of said one bistable circuit and the assertion output of said first immediately adjacent bistable circuit to a third one of said saturable magnetic cores and connecting the negation output of said one bistable circuit and the assertion output of said second immediately adjacent bistable circuit to a fourth one of said saturable magnetic cores, a sense winding connected in common to said first, second, third, and fourth saturable magnetic cores and to the complementing input of said one bistable circuit, core switching means coupled to all of said cores and being adapted to switch any core that is not saturated, and directional control means coupled to said plurality of saturable magnetic cores and adapted to saturate selected ones of said plurality of saturable magnetic cores to thereby control the direction of signal transfer between said one bistable circuit and said immediately adjacent bistable circuits.

8. A digital data shift register comprising a plurality of bistable circuits, said bistable circuits having an input connected thereto which input when activated is effective in reversing the bistable state thereof and each of the inputs to said bistable circuits being further adapted to be activated in accordance with the bistable state of its associated bistable circuit, each of said bistable circuits further having at least a first and a second output, a plurality of saturable magnetic core elements, a separate sense winding means coupled to each input of each bistable circuit and to two magnetic core elements, a first connecting means coupling said first output of each of said bistable circuits to one of said two magnetic core elements associated therewith, second connecting means coupling said second output of each of said bistable circuits to the other of said two magnetic core elements associated therewith, said first connecting means further coupling said first output of each one of said bistable circuits and said second output of each adjacent bistable circuit to a common one of said saturable magnetic core elements, said second connecting means further coupling said second output of each one of said bistable circuits and said first output of each adjacent bistable circuit to common ones of said saturable magnetic core elements, each of said outputs when active being adapted to saturate any core element coupled thereto, drive means coupled to all of said core elements to switch any core element which is not saturated, and suppress means coupled to said magnetic core to selectively inhibit the shifting of said shift register.

9. A bidirectional shift register comprising a plurality of adjacent bistable circuits each having a complementing input and a pair of outputs, a plurality of saturable magnetic cores, means connecting a first and second pair of said saturable magnetic cores to corresponding outputs of each of said plurality of bistable circuits, said last-named means further connecting one of said outputs of one of said bistable circuits and the opposing outputs from the immediately adjacent bistable circuits to separate ones of said first and second pair of saturable magnetic cores and further connecting the other of said outputs of said one bistable circuit and the other outputs from said immediately adjacent bistable circuits to separate ones of said first and second pair of saturable magnetic cores, a sense winding coupled to said first and second pair of saturable magnetic cores and to the complementing input of said one bistable circuit, a core switching means coupled to all of said plurality of saturable magnetic cores and being adapted to switch any core that is not saturated, and directional control means coupled to said first and second pair of magnetic cores to saturate selectively either one or the other of said pair of magnetic cores to control the direction of signal transfer between said one bistable circuit and said immediately adjacent bistable circuits.

References Cited by the Examiner

UNITED STATES PATENTS

| | | | |
|---|---|---|---|
| 2,734,184 | 2/1956 | Rajchman ---------- | 340—166 |
| 2,909,680 | 10/1959 | Moore et al. ------- | 307—88.5 |
| 3,023,401 | 2/1962 | Loew ------------- | 340—174 |

ARTHUR GAUSS, *Primary Examiner.*

IRVING L. SRAGOW, M. K. KIRK, S. D. MILLER, *Assistant Examiners.*